UNITED STATES PATENT OFFICE.

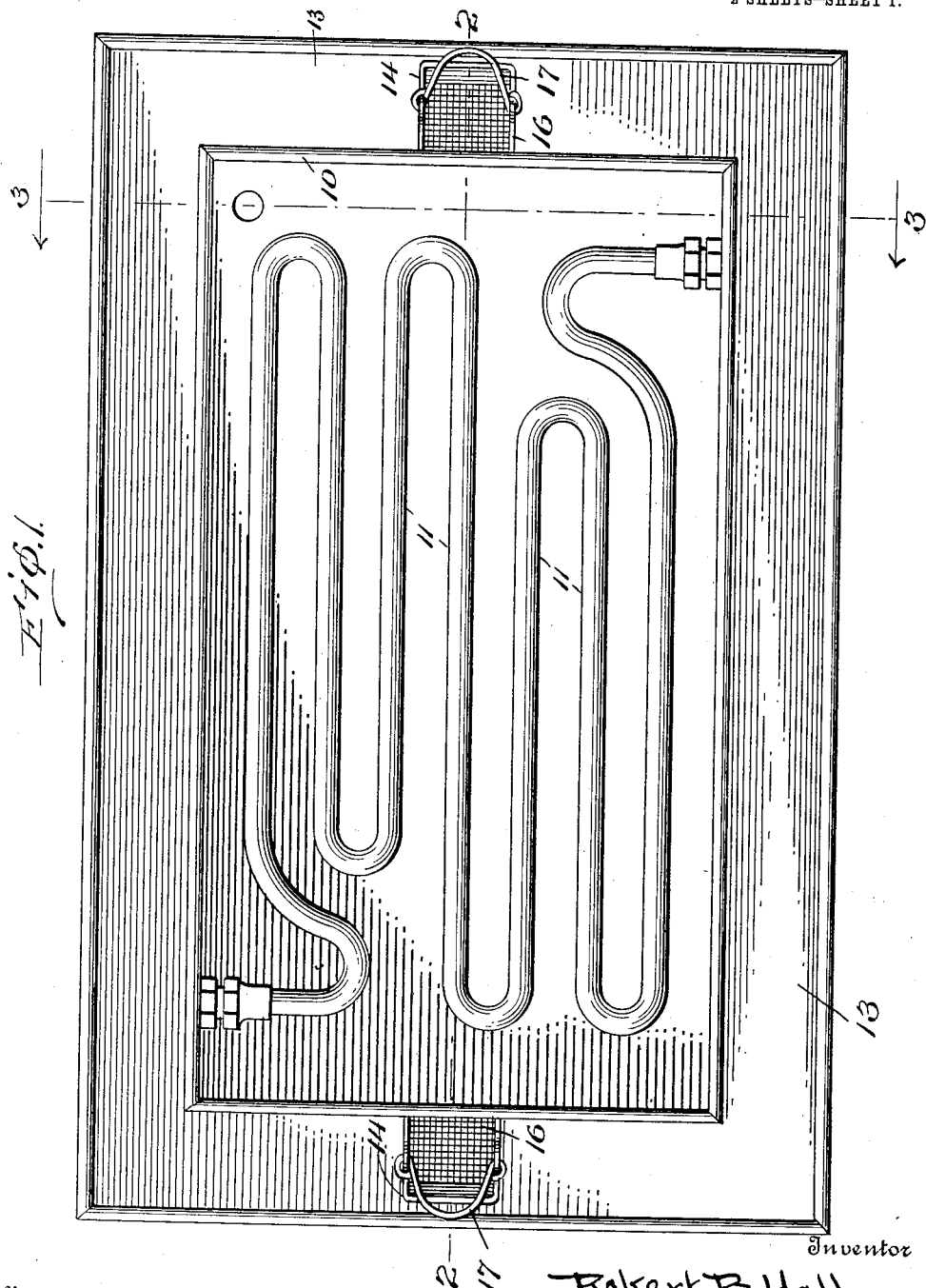

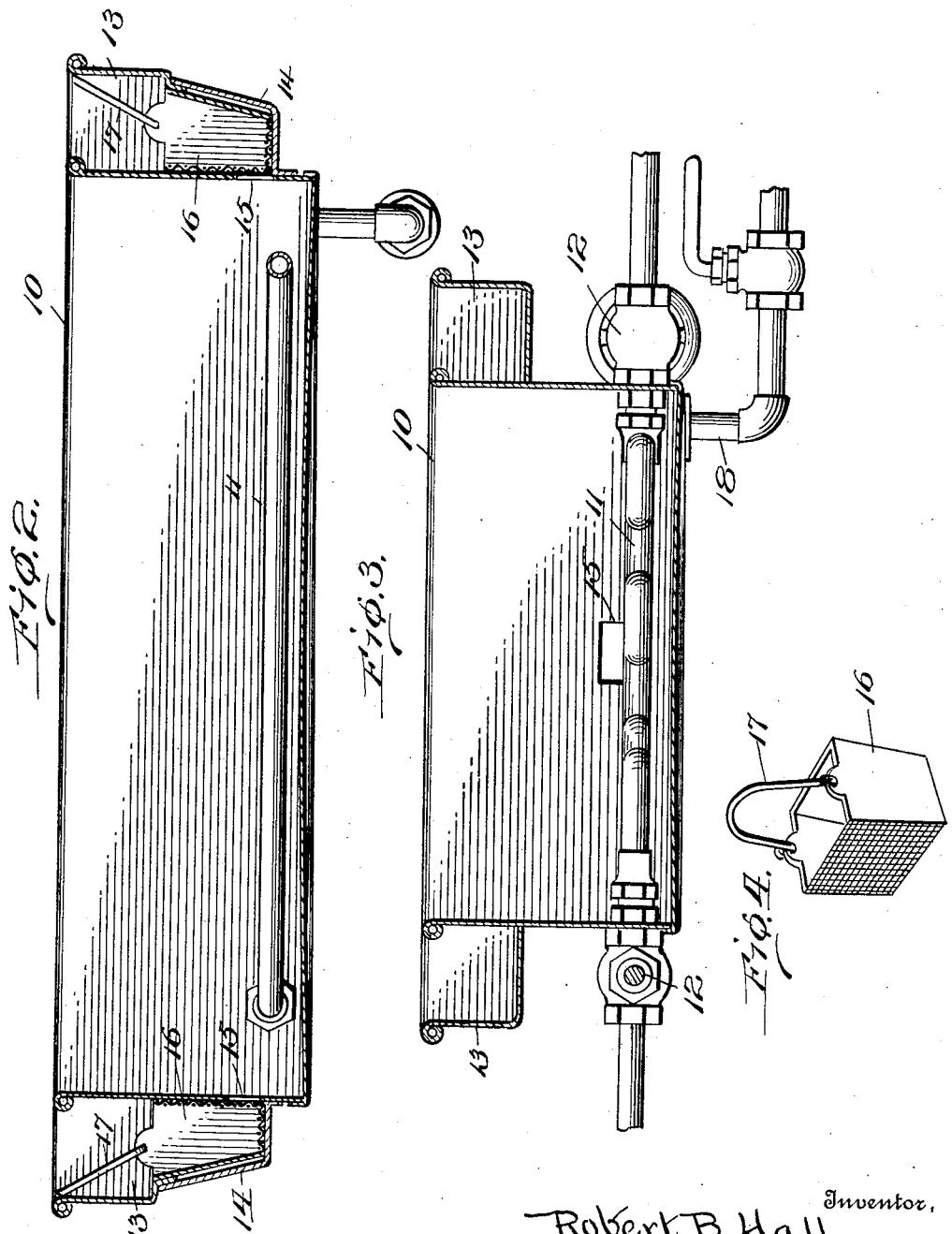

ROBERT B. HALL, OF MADISON, GEORGIA, ASSIGNOR OF ONE-HALF TO SHERWOOD ATKINSON, OF MADISON, GEORGIA.

EVAPORATOR.

1,039,525.

Specification of Letters Patent.

Patented Sept. 24, 1912.

Application filed April 2, 1912. Serial No. 688,015.

*To all whom it may concern:*

Be it known that I, ROBERT B. HALL, a citizen of the United States, residing at Madison, in the county of Morgan and State of Georgia, have invented certain new and useful Improvements in Evaporators; and I do hereby declare the following to be a full, clear, and exact description of the invention, such as will enable others skilled in the art to which it appertains to make and use the same.

This invention relates to evaporators and has especial reference to evaporators employed in the evaporation of cane juice to produce syrup, molasses, or the like.

An object of the present invention is to provide an evaporator of the self-skimming type embodying new and improved features of clarifying the material during the process of evaporation.

A further object of the invention is to provide an evaporator having a receptacle for containing the material to be evaporated, with a trough extending around the said receptacle into which the scum is discharged in the process of boiling with material contained in said trough for retaining the objectionable material and to discharge the liquid in a cool or partially cool condition back into the bottom of the reservoir.

A further object of the invention is to provide a reservoir for containing the liquid to be evaporated with a trough extending around said reservoir, said trough being formed with one or more conduits leading back into the receptacle adjacent the bottom of the receptacle with a septic bucket or filter placed removably in the conduit.

With these and other objects in view the invention comprises certain novel constructions, combinations and arrangements of parts as will be hereinafter more fully described and claimed.

In the drawings:—Figure 1 is a top plan view of the improved evaporator. Fig. 2 is a longitudinal sectional view of the evaporator taken on line 2—2 of Fig. 1. Fig. 3 is a transverse sectional view of the evaporator taken on line 3—3 of Fig. 1. Fig. 4 is a perspective view of one of the foraminous septic buckets removed.

Like characters of reference indicate corresponding parts throughout the several views.

The improved evaporator which forms the subject matter of this application comprises a reservoir or tank 10 of substantially the usual and ordinary type and heated in any approved manner as by the employment of the steam coil 11 controlled by any approved means, as the cocks 12.

Around the border or periphery of the reservoir 10 a trough 13 is constructed, the top of such trough being approximately flush with the top of the tank but being preferably considerably shallower than the depth of the tank, as shown particularly in Fig. 3. Also preferably, though not essentially, the trough 13 extends entirely around the reservoir 10 and at its opposite ends is provided with sumps 14 communicating through passages 15 with the reservoir adjacent its bottom. Into the sumps 14 septic buckets 16 are removably inserted, for convenience being provided with bails 17, it being understood however that the bails 17 form no essential part of the bucket but simply a means for handling such bucket for removing and replacing.

In operation the septic buckets are filled with a sponge or sponges while the troughs 13 are filled one-third or one-half full of bagasse. The liquid to be evaporated is then filled into the reservoir 10 nearly to but stopping short of the top. The liquid as filled into the reservoir is preferably to such a height as substantially equals the bagasse contained in the troughs 13. Heat is now applied in any approved manner as through the steam coil 11 and if steam is employed it is of course superheated to such an extent as to cause the contents of the reservoir to boil vigorously. The boiling of the contents of the reservoir causes the scum to rise to the top and to be discharged over the upper edge of the reservoir into the trough 13. In this trough it percolates through the bagasse contained in the trough, discharging certain quantities of the impurities and also becoming cooled as it flows around the trough toward the sumps 14. Arriving at the sumps 14 it passes through the septic buckets 16 and through the sponges contained in such bucket, discharging more of the impurities in such sponge formation. The septic buckets with the sponges contained may be readily removed from the troughs 13 for cleansing. Preferably one or more additional buckets is provided so that one may be removed and another replaced immediately to prevent the passage of uncleansed liquid into the reservoir. When the bagasse has become unduly impregnated with the impurities it is simply removed and thrown away and new bagasse supplied.

As the liquid in the reservoir 10 becomes heated it becomes lighter than the cooled liquid in the trough so that the liquid in the trough 13 does not assume as high a level as that in the reservoir and after a short space of boiling the liquid in the reservoir is wholly within the lines of the bagasse contained therein. When the molasses has been cooked to the desired degree it is withdrawn through the pipe 18.

The present invention produces syrup or molasses very much lighter in color than can be produced upon any of the devices ordinarily in use and also of improved flavor. While the chemical actions and re-actions, and also possibly some of the mechanical actions, are not thoroughly understood, it is believed that the cooling of the scum discharged into the trough and the consequent separation of the impurities from the liquid and the discharge of the liquid back into the reservoir in a cool or partially cool condition to there act upon the contents being boiled, has much to do with the clarity of the product and also the despatch with which the process can be performed in point of time.

I claim:—

1. In an evaporator, a reservoir, a trough arranged around the reservoir, sumps formed at opposite ends of the reservoir and sunken below the bottom of the trough, and strainers removably placed in the sumps.

2. In an evaporator, a reservoir, a trough extending around the reservoir and having its upper edge approximately level with the upper edge of the reservoir, sumps formed in the trough extending downwardly from the bottom of the trough adjacent the bottom of the reservoir and communicating therewith by an opening and perforate buckets inserted in the sumps and adapted to serve as strainers.

3. In an evaporator, a reservoir, a trough formed about the reservoir and having its upper edge substantially level with the upper edge of the reservoir, sumps formed in the trough extending below the bottom of the trough and adjacent the bottom of the reservoir and communicating therewith by an opening, and perforate buckets disposed in the sumps and adapted to contain a filtering material.

4. In an evaporator, a reservoir, a trough formed about the reservoir and having its bottom raised above the bottom of the reservoir, sumps formed in the trough extending below the bottom of the trough and adjacent the bottom of the reservoir and communicating therewith by openings, bagasse disposed in the troughs and positioned to receive the overflow from the reservoir and filtering material removably inserted in the sumps.

5. In an evaporator, a reservoir, a trough formed about the reservoir and having its bottom above the level of the bottom of the reservoir, sumps formed in the trough and extending downwardly from the bottom of the trough adjacent the bottom of the reservoir and communicating therewith by openings, bagasse disposed in the trough and positioned to receive overflow from the reservoir, perforate buckets removably inserted in the sumps, and filtering material removably carried by the buckets.

In testimony whereof I affix my signature in presence of two witnesses.

ROBERT B. HALL.

Witnesses:
GEORGE H. MACDONALD,
H. C. JOHNSON.

Copies of this patent may be obtained for five cents each, by addressing the "Commissioner of Patents, Washington, D. C."